United States Patent [19]

Malik et al.

[11] Patent Number: 4,529,374
[45] Date of Patent: Jul. 16, 1985

[54] GAS PARTICULATE SOLID SYSTEM

[75] Inventors: Tahir I. Malik, Islamabad, Pakistan; Felix J. Weinberg, London, England

[73] Assignee: The British Petroleum Company p.l.c., London, England

[21] Appl. No.: 672,859

[22] Filed: Nov. 19, 1984

Related U.S. Application Data

[63] Continuation of Ser. No. 430,478, Sep. 30, 1982, abandoned.

[30] Foreign Application Priority Data

Oct. 6, 1981 [GB] United Kingdom ................ 8131077

[51] Int. Cl.³ .............................................. F23C 11/02
[52] U.S. Cl. ....................................... 431/7; 431/170; 431/328; 432/14; 110/238
[58] Field of Search ................ 431/7, 170, 328, 326; 432/58, 14, 17; 422/139; 110/238, 245

[56] References Cited

U.S. PATENT DOCUMENTS

| | | | |
|---|---|---|---|
| 1,146,724 | 7/1915 | Lucke | 431/7 |
| 1,146,726 | 7/1915 | Lucke | 431/328 |
| 1,222,922 | 4/1917 | Bone et al. | 431/7 |
| 1,785,154 | 12/1930 | Symmes | 431/7 |
| 1,840,649 | 1/1932 | Winkler et al. | 48/203 |
| 1,963,758 | 6/1934 | Moss et al. | 431/170 |
| 3,050,299 | 8/1962 | Reed | 432/17 |
| 3,863,577 | 2/1975 | Steever et al. | 110/8 R |
| 3,981,690 | 9/1976 | Chen et al. | |
| 4,017,253 | 4/1977 | Wielang et al. | 432/58 |
| 4,021,193 | 5/1977 | Waters | |
| 4,051,791 | 10/1977 | Wormeer | |
| 4,075,953 | 2/1978 | Sowards | 110/8 F |
| 4,129,081 | 12/1978 | Baudin | 110/238 |

FOREIGN PATENT DOCUMENTS

| | | | |
|---|---|---|---|
| 792007 | 3/1980 | Australia | |
| 691488 | 7/1964 | Canada | 110/7 |
| 2160929 | 7/1973 | France | |
| WO81/02057 | 7/1981 | PCT Int'l Appl. | |
| 7902007 | 4/1979 | South Africa | |
| 1455982 | 11/1976 | United Kingdom | |
| 1589568 | 5/1981 | United Kingdom | 431/7 |
| 582827 | 12/1977 | U.S.S.R. | |

OTHER PUBLICATIONS

Canadian Journal of Chemical Engineering, vol. 52, Apr. 1974, pp. 129-143.

Primary Examiner—Samuel Scott
Assistant Examiner—H. A. Odar
Attorney, Agent, or Firm—Morgan, Finnegan, Pine, Foley & Lee

[57] ABSTRACT

A gas particulate solid system has a chamber capable of containing a bed of particulate solid and a supply of an oxygen containing gas. A line or lines having their outlet or outlets above the slumped bed directs the oxygen containing gas downwardly to impinge on the surface of the bed material so as to form a crater surrounded by circulating bed material. Fuel is supplied to the crater either in the gas stream or from an external source and after ignition combustion occurs in or near the crater.

8 Claims, 3 Drawing Figures

PARTICLE FLOW ⟶
GASEOUS FLOW ⇢

PARTICLE FLOW ⟶
GASEOUS FLOW ---->

GAS PARTICULATE SOLID SYSTEM

This application is a continuation of application Ser. No. 420,478, filed Sept. 30, 1982, now abandoned.

BACKGROUND OF THE INVENTION

1. Field of Invention

The present invention relates to a gas particulate solid system and more particularly relates to a gas particulate solid system in which a gas flow having a downward component is directed onto the surface of a slumped bed of particles.

2. Description of the Prior Art

The use of fluidised beds for combustion purposes such as burning of fossil fuels, incineration of combustible wastes etc. is well known. The process involves blowing air through a bed of particulate refractory material to maintain it in a fluidised state. The fuel is then introduced to the bed and burns within the bed which is thus maintained at operating temperature. Fluidised bed combustors are capable of high heat outputs and good heat transfer characteristics.

Spouted bed technology is also known and comprises passing a high velocity stream of gas vertically upwards through a mass of solid particles. The high velocity gas stream causes the particles to ascend rapidly in a hollowed central spout within the bed. Particles in a cone above the gas outlet are entrained while particles lying outside the cone descend slowly in a dense phase. The spouting action creates a fountain of particles above the slowly descending bed; and at lower flow rates in a deep bed, when the fountain does not break the surface it gives very high circulation rates of solid particles within the cone and a normal fluidised bed above the cone. In each case a cycle of solid particle movement is established. Although spouted bed technology is useful, for example, in drying, coating and granulation processes, solids blending, combustion, comminution and several chemical processes, it has disadvantages which include a relatively high pressure requirement to initiate stable spout operation. Also in multiple spout systems, the pressure drop across the nozzle must be high to avoid the fluid passing through only one outlet.

SUMMARY OF THE INVENTION

The present invention relates to a further form of gas and particulate solid system which offers certain advantages over conventional fluidised and spouted bed technology.

Thus according to the present invention there is provided a gas-particulate solid system comprising a chamber capable of containing a bed of particulate solid and a supply of an oxygen containing gas characterised in that a line or lines having their outlet or outlets above the slumped bed directs the gas downwardly to impinge on the surface of the bed material so as to form a crater surrounded by circulating bed material, there also being means for introducing a fuel to the crater.

The term downwardly is intended to include a gas flow having a downward component and does not only apply to a vertical flow of gas onto the bed.

The bed of particulate solids comprises particles of a size range and bulk density appropriate to the velocity of the downward gas flow. Thus the downward gas flow must have sufficient momentum to form the crater but not be so great as to cause extensive displacement of the particulate solids. Suitable bed materials include sand, crushed firebrick, alumina and coal ash.

There may be one or more gas flow lines and they are preferably fitted with outlet nozzles to produce a gas stream appropriate for the production of craters in the bed material.

There are a number of applications in which such a gas/particulate solids system may be used. Thus it may be used for the disposal of combustible waste materials and the combustion of fossil fuels including the extraction of heat from these combustion processes. Also it may be used for improving the combustion of lean mixtures and fuels of low calorific value by recirculating heat from products to reactants without simultaneous dilution by mixing, the bed material acting as a moving heat exchanger. Other uses of the system include heating, cooling and drying of solids, particle coating and use for chemical processes including catalytic processes within the bed.

The invention also includes a method of burning gas mixtures near or below their normal composition limits of flammability using a gas particulate solid system (as hereinbefore described) in which (a) the bed material is pre-heated and then (b) the gas mixture below its normal composition limit of flammability is introduced to the crater from the line outlet and ignited. The invention further includes a method of disposing of combustible solids or liquids using a gas particulate solid system (as hereinbefore described) in which (a) an oxygen containing gas from the line outlet is directed downwardly to impinge on the surface of the bed material so as to form a crater and (b) the combustible liquid or solid is introduced to the crater and ignited.

The bed material may be preheated in a number of known ways which include burning combustible gas in the crater or directing a flame from an overhead burner onto the bed material.

Examples of gas mixtures near or below their normal composition limits of flammability include those prepared from exhaust gases from a variety of industrial processes, blast furnace gases and coke oven gases.

BRIEF DESCRIPTION OF THE DRAWINGS

The invention will now be described by way of example only and with reference to FIGS. 1 to 3 of the accompanying drawings.

DESCRIPTION OF THE PREFERRED EMBODIMENTS

Figure 1:
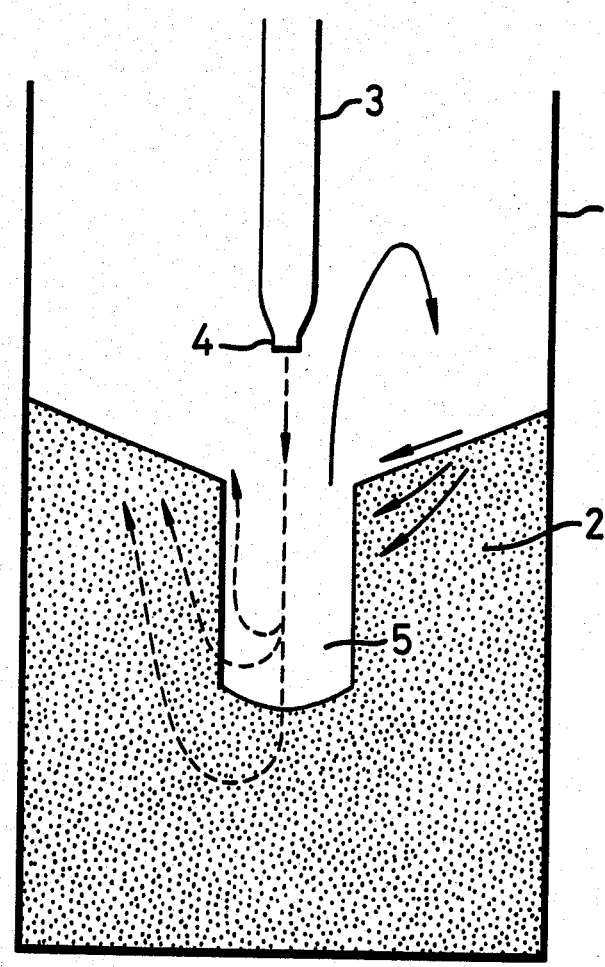
FIG. 1 is a schematic diagram of a gas particulate solid system according to the invention and FIGS. 2 and 3 are experimental layouts for single and multi nozzle systems respectively.

The gas/particulate solid system comprises a cylindrical chamber 1 containing a bed material 2. The bed material may be any suitable particulate solid and includes sand, alumina particles and coal ash. In combustion processes, the bed 2 may be contained by a refractory lined or water cooled vessel (not shown).

A pipe 3 connected to a source of pressurized gas (not shown) is located above the bed. The outlet end of the pipe 3 takes the form of a nozzle 4 which is arranged a short distance above the slumped level of the bed 2.

During use, a jet of gas from nozzle 4 is arranged to impinge on the surface of the bed 2 of solid particles in a downward direction, as shown in FIG. 1. A displacement of particles takes place from the region surrounding this volume. The cavity 5 formed below the nozzle 4 has a well defined cylindrical shape with a rounded base and is termed the crater. The new height of the expanded bed surrounding the crater forms a slope up to the wall of the bed where it is the maximum height. The amount of particles displaced and so the size of the crater and the expansion of the bed is a function of several variables and is related to the momentum flux in the jet of gas. In addition to this displacement there is a regular flow pattern of the particles and depending on the type, size and shape of particles a fountain of particles is also obtained.

The flow pattern of the fluid is also shown in FIG. 1. From the nozzle the jet increases in diameter. From the injectories of the solid particles in the fountain it can be deduced that the maximum velocity of the reverse flow of gas occurs in a narrow region near the walls of the crater. The maximum height of the solid particles is obtained in this narrow region. The flow of gas outside this narrow region is analogous to countercurrent flow to a moving bed of particles and in the more further parts to simple flow through a packed bed of particles.

The flow pattern of the particulate solids is dependent on the particle size and on the flow velocities of the fluid. If the size is small enough then the maximum reverse velocity of the fluid might be enough to entrain the particles to form a fountain. If the flow rates are much higher then the region of this annulus from which the fountain begins becomes accordingly wider. Experimental work has shown that alumina particles of 18-22 mesh size readily lead to a fountain whereas glass beads of 3 mm diameter produced movement only within the bed in addition to the crater formation, probably due to the decreased resistance to the flow of gas leading to a greater dispersion of gas into the annulus.

The particles from the fountain fall on the surface of the bed at various positions. Depending on the flux of particles through the fountain, they may move towards the crater either on or beneath the surface.

The gas particulate solid system can be used for the disposal of lean fuel gas-air mixtures. The term lean fuel gas-air mixtures refers to gas mixtures in which the percentage of fuel is lower than that required for stoichiometric combustion and may be near or below their normal composition limits of flammability. The lean limit of flammability of a methane air mixture is 5% of methane by volume.

Figure 2:
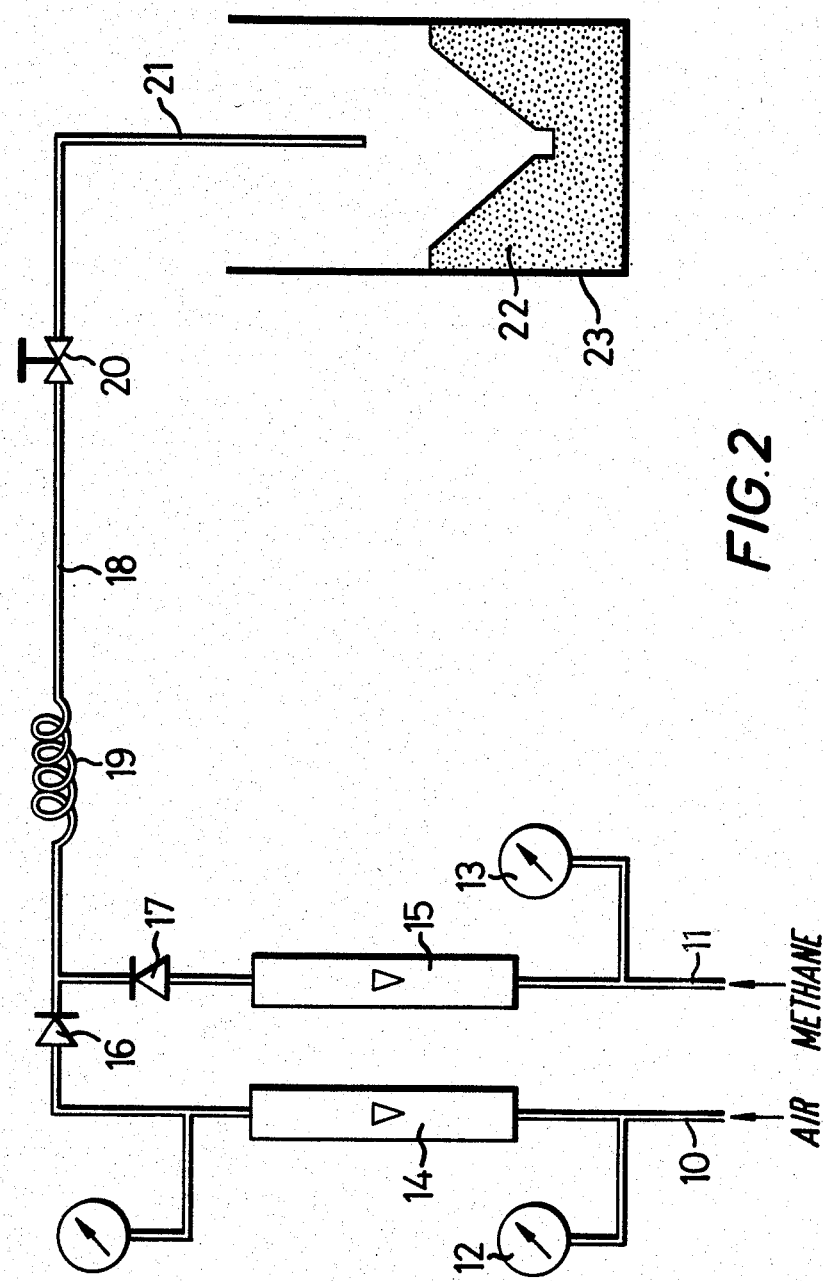

FIG. 2 illustrates the apparatus used for the combustion of air-methane gas mixtures using sand particles of approximate diameter 1400 microns. Air and methane supplies are connected to lines 10 and 11 respectively, the pressures being measured by gauges 12 and 13 set in side arms. Lines 10 and 11 pass downstream to flowmeters 14 and 15. Each line has a non return valve 16, 17 downstream of which the lines 10, 11 join to form a single line 18 which passes downstream to a mixing coil 19 and a gate valve 20. Downstream of the gate valve 20 is a pipe nozzle 21 located just above a slumped bed 22 of sand particles contained in a metal cylinder 23.

In use, the methane air mixture is supplied to outlet nozzle 21 and ignited to form a flame in the resultant crater in the bed. The lean limit for stable combustion for three pipe sizes and various methane air flowrates are shown in Table 1.

The gas mixture is ignited and the bed allowed to heat up. The lean limit under hot start up conditions is found by gradually reducing the methane flow rate further until combustion can just be sustained, when the flowrates are again recorded. This was repeated for various flowrates and pipe separations.

TABLE 1

Lean Limit for Stable Combustion for a Single Pipe

| Pipe Size | Flow Rates (l/min) Air | Methane | Total | Velocity (m/s) | % Methane |
|---|---|---|---|---|---|
| Small (ID = 3.9 mm) | 3.2 | 0.19 | 3.4 | 4.7 | 5.6 |
|  | 13.2 | 0.72 | 14.0 | 19.5 | 5.1 |
|  | 18.0 | 0.87 | 18.8 | 26.1 | 4.6 |
|  | 24.5 | 1.20 | 25.7 | 35.7 | 4.7 |
|  | 32.0 | 1.35 | 33.4 | 46.4 | 4.0 |
| ID-internal diameter | 39.1 | 2.00 | 41.1 | 57.1 | 4.9 |
| Medium (ID = 7.4 mm) | 17.6 | 1.12 | 18.7 | 7.1 | 6.0 |
|  | 31.0 | 1.80 | 32.8 | 12.4 | 5.5 |
|  | 55.5 | 2.25 | 57.8 | 21.9 | 3.9 |
|  | 75.5 | 2.90 | 78.4 | 29.7 | 3.7 |
| Large (ID = 9.0 mm) | 21.2 | 1.44 | 22.6 | 5.9 | 6.4 |
|  | 29.0 | 1.60 | 30.6 | 8.0 | 5.2 |
|  | 42.5 | 2.10 | 44.6 | 11.6 | 4.7 |
|  | 59.0 | 2.65 | 61.7 | 16.1 | 4.3 |
|  | 72.0 | 3.25 | 75.3 | 19.6 | 4.3 |

Figure 3:
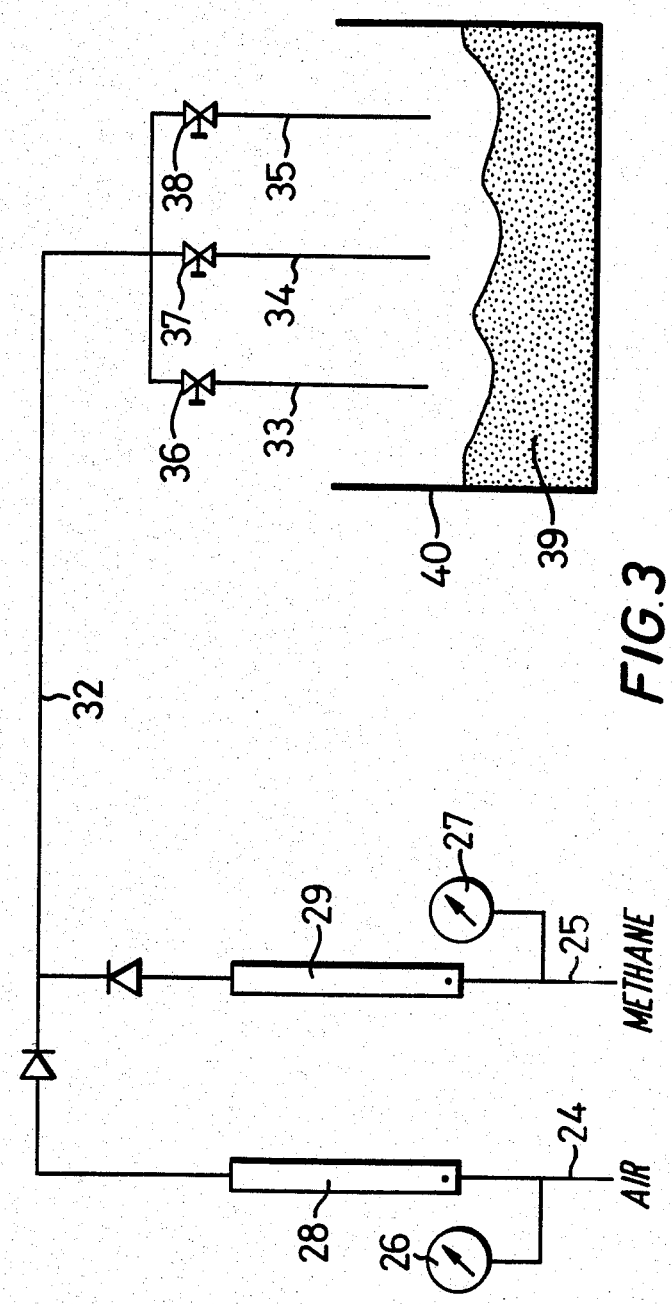

FIG. 3 illustrates a multi nozzle assembly for use in the gas particulate solid system. Thus three nozzle pipes are arranged in the form of an equilateral triangle and the flow velocity is assumed to be the same for each. The lean limit for the arrangement with various methane air flow rates are shown in Table 2.

Air and methane supplies are connected to lines 24, 25 respectively, the pressures being measured by gauges 26, 27 set in side arms and the gas flow rates are measured by rotameters 28, 29. Each line has a non return valve 30, 31 downstream of which the line 24, 25 join to form a single line 32. The line 32 splits into three pipe nozzles 33, 34, 35 arranged in the form of an equilateral triangle, each nozzle being controlled by gate valves 36, 37, 38. Each nozzle is located just above a slumped bed 39 of sand particles contained in a metal cylinder 40.

The gas mixture was ignited and the bed allowed to heat up and the methane flow gradually reduced until combustion could only just be sustained. The lean limit for stable combustion of flammability was hence found for various total flowrates.

TABLE 2

Lean Limit for Stable Combustion for Three Pipes Arranged in an Equilateral Triangle of Sides 45 mm

| Flowrate/(l min) Methane | Total | % Methane | Linear Jet Velocity (m/sec) |
|---|---|---|---|
| 1.15 | 21.7 | 5.3 | 10.0 |
| 1.65 | 33.2 | 5.0 | 15.4 |
| 2.00 | 40.0 | 5.0 | 18.5 |
| 2.10 | 52.6 | 4.0 | 24.4 |
| 3.00 | 65.0 | 4.6 | 30.1 |
| 3.10 | 84.1 | 3.7 | 38.9 |
| 3.80 | 100.8 | 3.8 | 46.7 |

The particles circulate through the flame and fall back on the bed. The fresh gas is preheated to some extent by passage through the inlet tube. This preheated gas then passes into the crater inside which it receives radiation flux from the crater walls. The gas flows upwards and encounters further hot particles before reaching the surface.

At low throughputs the flame occupies the space around the crater. This is facilitated by the fact that most of the gas passes through this region. Thus virtually the complete particle circulation passes through the flame. The fact that, at moderate flow rates, the flame does not extend to the bed walls ensures that heat losses are kept at a minimum, the particles near the wall acting as a shield. At higher throughputs particle temperatures increase and combustion appears to take place throughout the fluidised region of the bed.

Table 3 gives the results of a series of experiments in which stable flames of relatively lean gas fuel mixtures were used:

TABLE 3

| % Methane | Total Gas Flow L/min |
| --- | --- |
| 2.7 | 20.8 |
| 2.7 | 21.2 |
| 2.6 | 21.6 |
| 2.7 | 23.0 |
| 2.8 | 24.5 |
| 3.0 | 26.9 |
| 3.1 | 30.2 |
| 3.3 | 31.0 |
| 3.8 | 36.8 |
| Bed material | alumina particles (22–25 mesh) |
| Bed diameter | 38 mm |
| Inlet tube diameter | 15 mm |
| Nozzle diameter | 1.5 mm |
| Initial bed height | 110 mm |
| Height of nozzle tip above initial bed height | 15 mm |

The gas outlet may take various forms apart from the simple single hole arrangement. Thus by using an outlet nozzle having a number of holes in its periphery, different forms of crater may be obtained in the bed. For example, a series of outlet holes around the circumference of a nozzle will yield a bed surface taking the form of valleys and mountains spreading from the centre (nozzle). It is possible to manipulate particle movement in the bed by changing the numbers of outlet holes of the nozzle and their angle of incidence on the bed surface. This enables the movement of bed particles to be arranged to obtain the most effective performance. A bed of large area may have an array of separate nozzles and turn down may be further increased by varying the number in use at any one time.

Table 4 shows that the minimum nozzle velocity for formation of a crater within the bed increases consistently with the height of the nozzle above the bed for an air-sand system. In general, for a nozzle close to the bed surface, formation of the crater occurs at nozzle velocities above 4 to 8 meters/sec.

Other results also indicated that the bed parameters of bed crater depth and width and particle fountain height correlate with the product of the air nozzle flow and the nozzle velocity, i.e. the air momentum flux in that they are independent of nozzle diameter and within limits the height of the nozzle above the bed for a given air momentum flux.

TABLE 4

Threshold Fluidisation Data - Minimum Nozzle Velocity at Which Bed Fluidisation is Seen

| Pipe Height (mm) | Minimum Fluidisation Velocity (m/s) at pipe ID (mm) | | | |
| --- | --- | --- | --- | --- |
|  | 3.9 | 7.4 | 9.0 | 2 × 3.9 |
| 10 | 4.03 | 5.97 | 5.83 | 4.58 |
| 20 | 4.03 | 8.03 | 6.38 | 4.86 |
| 30 | 4.31 | 8.48 | 6.64 | 5.35 |
| 40 | 5.00 | 10.23 | 8.85 | 5.83 |

Alternative systems include using the outlet nozzle to supply an oxygen containing gas such as air to the bed and introducing fuel either liquid or solid to the crater area. In the case of solid fuels e.g. coal this may be done by using an overbed conveyor device and in the case of liquid fuel, e.g. oil, the fuel may be introduced upstream of the nozzle outlet or from a separate nozzle in the chamber.

We claim:

1. A method of disposing of combustible material which is a solid, liquid or gas comprising the steps of:
   (a) pre-heating an initially static bed of a particulate material contained in a chamber,
   (b) causing an oxygen containing gas to be passed downwardly to impinge on a surface of the initially static bed of particulate material thereby forming a crater in the bed with recirculation of the particulate material,
   (c) introducing the combustible material into the crater and igniting combustible mixture, the combustible material being itself heated by thermal contact with the recirculating particulate material.

2. A method according to claim 1 in which the combustible material is introduced to the crater in the oxygen containing gas flow.

3. A method according to claim 2 in which a combustible gas is pre-mixed with oxygen containing gas prior to introduction to the crater.

4. A method according to claim 3 in which the combustible gas is near or below its normal composition limit of flammability.

5. A method according to claim 1 in which a solid or liquid combustible material is introduced from an external source to the crater.

6. A method according to claim 1 in which the bed is preheated by passing gaseous fuel from line outlets to form a crater in the bed and igniting the fuel.

7. A method according to claim 1 in which a liquid combustible material is introduced to the crater from an external nozzle.

8. A method according to claim 1 in which the particulate material is a solid selected from the group consisting of sand, crushed firebrick, alumina and coal ash.

* * * * *